Oct. 17, 1944.   L. T. WARD.   2,360,603
AERATING BOTTLE OR THE LIKE
Filed June 9, 1941

INVENTOR
LAWRENCE T. WARD
BY Bair & Freeman
ATTORNEYS

Patented Oct. 17, 1944

2,360,603

UNITED STATES PATENT OFFICE 2,360,603

AERATING BOTTLE OR THE LIKE

Lawrence T. Ward, Philadelphia, Pa., assignor to Knapp-Monarch Company, St. Louis, Mo., a corporation of Missouri Application June 9, 1941, Serial No. 397,285

13 Claims. (Cl. 222—153)

My present invention relates to an aerating bottle or the like in which liquid, such as cream or the like, is adapted to be aerated or similarly treated.

One object of my invention is to provide an aerator in which milk products and other products, such as waffle dough, scrambled eggs and many cooking recipes, can be aerated without beating or churning.

Another object is to provide an aerator having a control valve structure of simple, durable and inexpensive construction.

Still another object is to provide the control valve structure in the form of a unit or assembly which may be readily removed from the head of the aerator vase to permit access to a passageway and parts of the valve exposed to liquid from the vase for easy, quick and thorough cleaning thereof.

A further object is to provide a valve structure which may be readily operated by depressing a hand lever after the aerator has been filled with liquid and the liquid aerated, means being provided, however, to prevent opening of the valve except when the aerator is inverted to dispensing position.

With these and other objects in view, my invention with respect to its features which I believe to be novel and patentable will be pointed out in the claims appended hereto. For a better detailed understanding of the invention, and further objects relating to details of economy of my invention, reference is made to the following description and to the accompanying drawing wherein such further objects will definitely appear, and in which Figure 1 is a perspective view of an aerator or the like embodying my invention;

Figure 1:
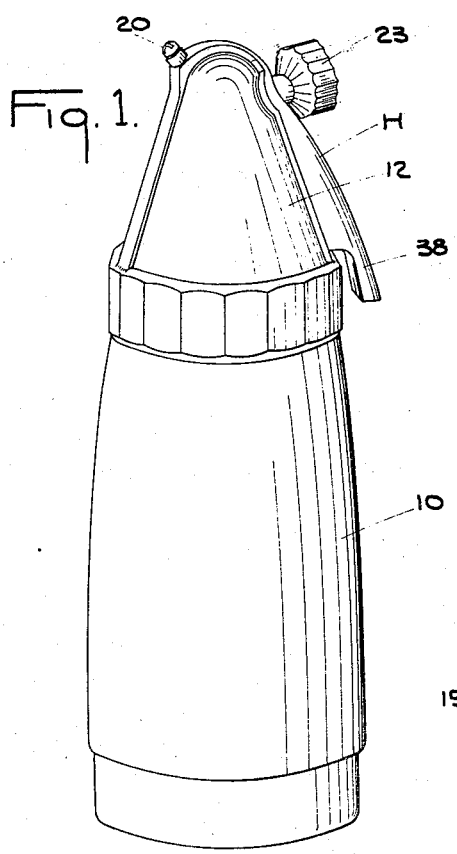
Figure 2:
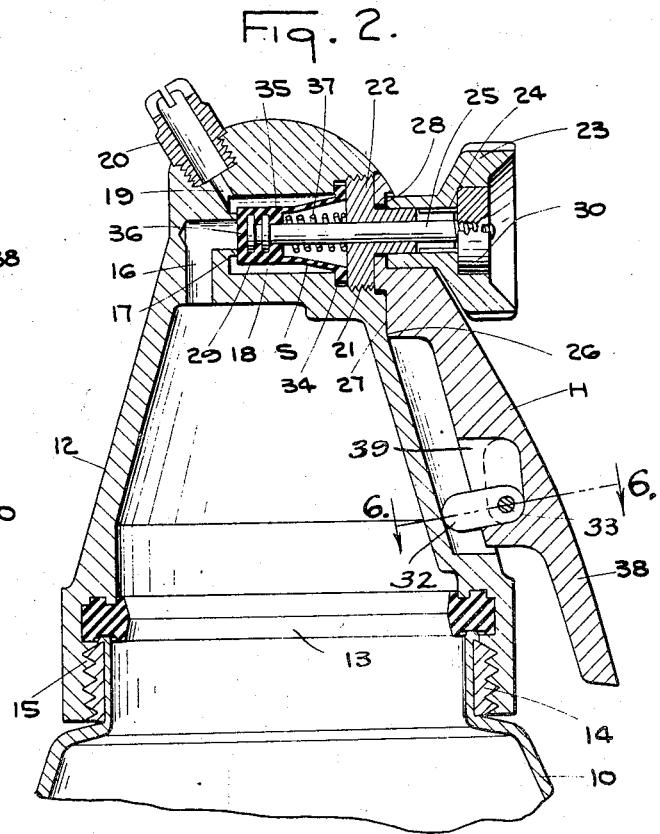
Figure 2 is a vertical sectional view through the upper portion of the aerator.

On the accompanying drawing, I have used the reference numeral 10 to indicate a vase adapted to receive liquid, such as cream or an ice cream mix. Detachably mounted on the vase 10 is a vase head 12. The vase head 12 is provided with screw threads 15 adapted to coact with threads 14 of the vase 10 so that the head may be attached and detached relative to the vase as desired.

A gasket 13 is interposed between the vase and the head to effect a gas and liquid-tight seal therebetween when the parts 10 and 12 are connected together.

In the vase head 12 I provide a passageway having a vertical portion 16 and a lateral portion 16a. The portion 16a terminates in a valve seat 17 opening into a bore 18. A second passageway 19 is provided leading to a decorating nozzle 20 screwed into the vase head 12.

The bore 18 in the head 12 has a threaded enlarged part at 21 adapted to receive a sleeve nut 22. The sleeve of the nut 22 is indicated at 22a and is slotted as indicated at 22b. A knob 23 is adapted to screw the nut 22 into or out of the threads 21, and for this purpose the knob is slidably mounted on the sleeve 22a. The knob is made non-rotatable relative to the sleeve by means of a pair of keys 24 extending into the slot 22b of the sleeve 22a.

A valve stem 25 is connected with the knob 23 by means of a thick disclike nut 30. The inner end of the stem 25 has a head 29 consisting of two flanges around the stem. The head 29 is embedded in a valve plug portion 36 of a sleeve element S. The element S has a gasket ring portion 34 at its end opposite the valve plug 29 and a tubular diaphragm portion 35 spanning the distance between the valve plug 36 and the gasket ring 34. The sleeve element S is made of suitable resilient material, such as rubber or the like.

Figure 4:
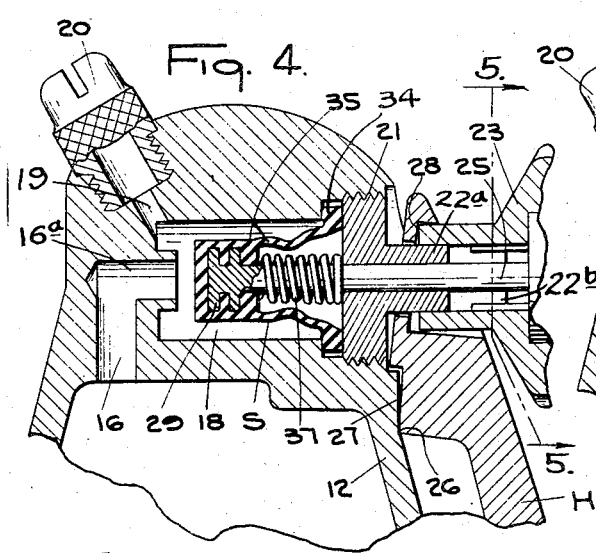
Figure 4 is a similar view showing the valve in open position.
Figure 3:
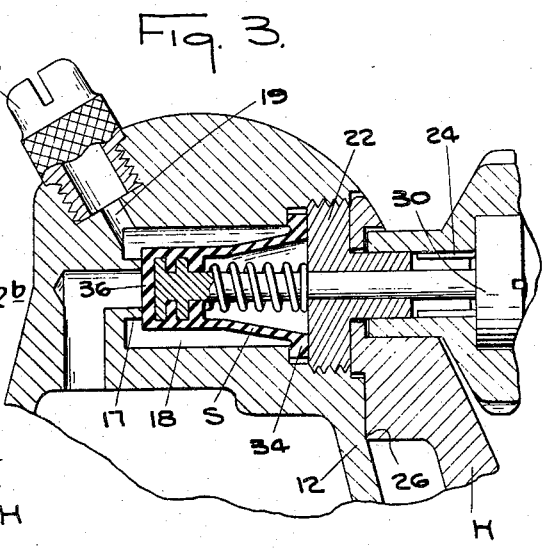
Figure 3 is an enlarged sectional view of the valve mechanism therein showing it in closed position.
Figure 5:
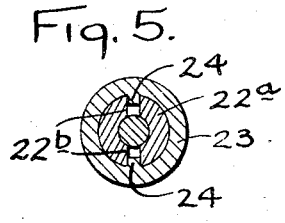
Figure 5 is a sectional view on the line 5—5 of Figure 4 showing a slidable and non-rotatable connection between a nut and a knob of the valve assembly.
Figure 6:
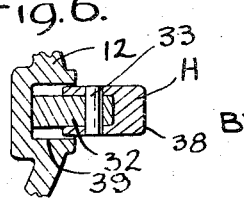
Figure 6 is a sectional view on the line 6—6 of Figure 2 showing the coaction of the operating handle of my aerator with a vase head thereof.

Within the sleeve element S, I provide a spring 37 which tends to normally seat the valve plug 36 on the valve seat 17. An operating handle H is provided for unseating the valve. The handle H has a shoulder indicated at 26 adapted to pivot against a shoulder 27 of the vase head 12. The handle H also has a perforated disc portion presenting a face 28 adapted to engage the inner end of the hub or sleeve of the knob 23. When the handle H is depressed at its lower end, indicated at 38, it will assume the position shown in Figure 4, thus prying outwardly on the knob 23 and resulting in retraction of the valve stem 25 and the valve plug 36. This opens the valve at the seat 17 to permit flow of liquid therethrough, as will hereinafter be described.

The handle H is received in a groove 31 of the vase head 12. The groove permits inward swinging of the handle and prevents rotation of the handle around the sleeve nut 22.

A gravity lock 32 is provided in the form of a lug pivoted on a pin 33. The lug 32 is mounted in a socket 39 of the handle H.

*Practical operation*

My aerator is adapted for commercial use as a device for supplying whipped cream and employs the principles of aeration by the media of compressed gases. The compressed gases referred to may be carbon dioxide, nitrous oxide, or a combination of the two, or other gases that may be found suitable for this purpose. The aerator is designed particularly for use with Sparklet bulbs containing such gases. For this purpose, the bottom of the vase 10 is provided with piercing mechanism for a Sparklet bulb, such as shown in my copending application, Serial No. 348,239, filed July 29, 1940. Since such mechanism forms no part of my present invention I have not illustrated it.

When a Sparklet bulb containing a predetermined quantity of gas is connected with the bottom of the vase 10, after the vase has been filled with milk or cream products, and the head 12 is screwed tightly in position, such gas will aerate or increase the volume of the liquid so as to produce a satisfactory quality of so-called whipped cream. During the period the gas is passing into the vase 10, it is shaken so as to facilitate the absorption of the gas by the cream or milk product. After the gas has entered the container the Sparklet bulb can be removed and the aerator is ready for dispensing.

For dispensing whipped cream, the entire unit is inverted and the nozzle is directed toward the point at which the cream is to be dispensed. By pressing the handle H, the valve plug 36 is lifted from the seat 17 and the aerated cream within the vase thereupon passes out through the nozzle 20. Whenever the handle H is released the spring 37 again seats the valve, thus closing off the flow of whipped cream.

The gravity lock 32, when the vase is in upright position, prevents the handle H from being depressed. When the vase is inverted, however, the gravity lock falls to the position shown by dotted lines into the cavity 39 of the handle H and permits the handle to function. The purpose of the gravity lock is to prevent the operator from discharging gas from the vase when it is in an upright position. At that time the cream or milk product is in the vase and the vase head 12 is filled with the gas. To depress the handle H in this position would result in loss of a portion or all of the gas pressure necessary to effectively aerate the contents.

Whenever the contents are fully discharged, the head can be unscrewed from the vase. The entire valve assembly may then be readily removed without the aid of any tools by merely using the knob 23 to unscrew the nut 22. The outside of the sleeve element S may then be readily washed and the passageways 16, 16a, 19 and the bore 18 are each exposed for ease of washing them out. The structure may thereby be cleaned with a minimum of time and bother.

In addition to aerating milk or cream, my aerator may be used for aerating other mixtures, such as ice cream mixes before they are frozen. After an ice cream mix has been aerated, the handle H may be depressed to discharge the mix into a tray for freezing in a refrigerator unit. An alternative method involves tipping the vase backwardly from its upright position until the lug 32 swings into the cavity 39 (dotted position), then tipping it forwardly again to almost vertical position. The gas is then permitted to discharge to atmosphere by depressing the handle H, after which the head 12 may be removed and the ice cream may be poured out of the vase 10 into the refrigerator tray.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In an aerating bottle or the like, a vase adapted to receive liquid, a head mounted thereon, a passageway through said head, a valve seat interposed in said passageway, a valve and operating assembly comprising a combined valve plug and gasket element of resilient material having a plug at one end, a gasket ring at its other end, and a diaphragm connecting said ends together, a valve stem having a head embedded in said plug end of said element, said vase head having a bore aligned with said valve seat to receive said element and a shoulder to abut the gasket ring thereof, means in said bore to seal said gasket ring relative to said head, a knob for operating said means, the outer end of said valve stem being connected to said knob, a spring to normally seat said valve plug on said valve seat, and an operating lever interposed between said means and said knob to retract said valve plug upon pressure being applied to said lever.

2. In an aerating bottle or the like, a vase adapted to receive liquid, a head thereon, a passageway through said head, a valve seat interposed in said passageway, a valve and operating assembly comprising a combined valve plug and gasket element having a plug at one end, a gasket ring at its other end and a flexible diaphragm connecting said ends together, a valve stem for said plug end of said element, a nut having a bore in which said valve stem is slidably mounted, said vase head having a bore aligned with said valve seat to receive said element, a shoulder to abut the gasket ring thereof and a threaded part to receive said nut, a knob slidably and non-rotatably mounted on said nut, the outer end of said valve stem being connected thereto, a spring within said element to normally seat said valve plug on said valve seat, and means interposed between said nut and said knob to retract said knob, stem and valve plug.

3. In an aerating bottle or the like, a vase adapted to receive liquid, a head detachably mounted thereon, a passageway through said head, a valve seat interposed in said passageway, a nozzle at the discharge end of said passageway, and a valve and operating assembly including a combined valve plug and gasket element of resilient material having a plug at one end, a gasket ring at its other end and a flexible tubular diaphragm connecting said ends together, a valve stem having a head embedded in said plug end of said element, a sleeve nut having a bore in which said valve stem is slidably mounted, said vase head having a bore aligned with said valve seat to receive said element, a shoulder to abut the gasket ring thereof and a threaded part to receive the nut portion of said sleeve nut, a knob slidably and non-rotatably mounted on the sleeve of said sleeve nut whereby rotation of said sleeve nut may be effected by rotation of said knob, the outer end of said valve stem being connected thereto, a spring to normally seat said valve plug on said valve seat, and an operating handle interposed between said sleeve nut and said knob and adapted to retract said knob, stem and valve plug upon pressure being applied to said handle causing it to pivot on said vase head at a point spaced from the axis of said stem.

4. In an aerating bottle or the like, a vase adapted to receive liquid, a head mounted thereon, a passageway through said head, a valve seat interposed in said passageway, and a valve and operating assembly comprising a combined valve plug and gasket element having a plug at one end, a gasket ring at its other end and a flexible tubular diaphragm connecting said ends together, a valve stem having a head in said plug end of said element, a sleeve nut having a bore in which said valve stem is slidably mounted, said vase head having a bore aligned with said valve seat to receive said element, a shoulder to abut the gasket ring thereof and a threaded part to receive the nut portion of said sleeve nut, a knob for rotating said sleeve nut and retracting said valve stem, said knob being slidably and non-rotatably mounted on the said sleeve nut and the outer end of said valve stem being connected to said knob, and an operating lever interposed between said sleeve nut and said knob.

5. In an aerating bottle, a vase, a vase head mounted thereon, a passageway in said head, a valve seat at the terminal end of said passageway, a second passageway from said valve seat to the exterior of said head, a nozzle at the discharge end thereof, and a valve and operating assembly comprising a combined valve plug and gasket element having a valve plug at one end and a gasket ring at its other end, said plug and ring being connected by a flexible diaphragm portion of said element, a valve stem having one end connected with said valve plug, said vase head having a bore aligned with said valve seat to receive said element and a shoulder in said bore to abut said gasket ring, means to seal said gasket ring against said shoulder, a knob for operating said means, the outer end of said valve stem being connected to said knob whereby said knob also serves as a means to retract said valve stem, an operating lever adapted to engage and retract said knob, upon pressure applied to said lever for moving it to dispensing position, and means to prevent such pivotal movement comprising a gravity operated pivoted stop lug adapted in the upright position of said vase to assume a position interposed between said lever and said vase head and in the inverted position of the vase to assume a position not so interposed.

6. In an aerating bottle, a vase adapted to receive liquid, a vase head mounted thereon, a valve in said head, and an operating lever for opening said valve upon pressure being applied to said lever to move it, and means to prevent valve opening movement of said lever comprising a gravity operated lug pivotally carried by said lever and adapted in the upright position of said vase to assume a position interposed between said lever and said vase head and in the inverted position of the vase to assume a position not so interposed.

7. In an aerating bottle or the like, a vase adapted to receive liquid to be aerated, a vase head mounted thereon, a passageway upwardly into said head and bending laterally therein, a valve seat at the terminal end of said passageway, a second passageway from said valve seat to the top of said head, a nozzle at the discharge end thereof, and a valve and operating assembly comprising a combined valve plug and gasket element of rubber or the like having a valve plug at one end and a gasket ring at its other end, said plug and ring being connected by a flexible tubular diaphragm portion of said element, a valve stem having one end embedded in said valve plug, a sleeve nut having a bore in which said valve stem is slidable, said sleeve nut being removable by rotation from said vase head, said vase head having a bore aligned with said valve seat to receive said element, a shoulder in said bore to abut said gasket ring, said sleeve nut being threaded into said bore against said gasket ring, a knob slidably and non-rotatably mounted on said sleeve nut for rotating it, the outer end of said valve stem being connected to said nut whereby it serves as an engagement shoulder on said valve stem for retraction purposes, spring means to normally seat said valve plug on said valve seat, and an operating hand lever interposed between said sleeve nut and said knob and adapted to retract said knob, stem and valve plug upon pressure applied to said hand lever causing it to pivot on said vase head.

8. In an aerating bottle structure, a vase adapted to receive liquid for aeration, a vase head detachably mounted thereon, a passageway through said vase head including a valve seat interposed therein, a nozzle at the discharge end of said passageway, a valve and valve operating assembly comprising an element having a valve plug at one end, a gasket ring at its other end and a flexible tubular diaphragm connecting said ends together, a spring to bias said valve plug to seated position on said valve seat, a valve stem connected with said element, a nut screw-threadedly mounted in said vase head and having a bore to slidably receive said stem, a knob connected with said stem and operatively connected with said nut to screw and unscrew it relative to said vase head, an operating lever interposed between said nut and said knob, means for pivotally mounting said operating lever relative to said vase head whereby pivotal movement thereof effects retraction of said valve plug from said valve seat against the bias of said spring, said vase head having a groove to receive said handle to prevent rotation thereof about said valve stem.

9. In an aerating bottle structure, a vase, a vase head mounted thereon, a passageway through said vase head including a valve seat interposed therein, an element having a valve plug at one end, a gasket ring at its other end, and a flexible tubular diaphragm connecting said ends together, a valve stem connected with said element, means mounted in said vase head and having a bore to slidably receive said stem, a knob connected with said stem and operatively connected with said means to connect and disconnect it relative to said vase head, an operating lever, means for pivotally mounting said operating lever relative to said vase head whereby pivotal movement thereof effects retraction of said valve plug from said valve seat, said vase head having a groove to receive said handle to prevent rotation thereof about said valve stem, and a gravity locking element mounted in said groove and pivotally mounted to swing from a position interposed between said handle and the bottom of said groove when said vase is in upright position and to swing to a position permitting said operating lever to be swung into said groove when the vase is inverted.

10. An aerating bottle structure comprising a vase adapted to receive liquid for aeration, a vase head detachably mounted thereon, a passageway through said vase head including a valve seat interposed therein, a nozzle at the discharge end of said passageway and a valve and valve operating assembly comprising an element having a valve plug at one end, a gasket ring at its other end, and a flexible tubular diaphragm connecting said ends together, a valve stem connected with the valve plug of said element, means to seal said gasket ring relative to said head, a knob connected with said stem for retracting it and operatively connected with said means for operating it, an operating lever interposed between said means and said knob, and means for pivotally mounting said operating lever relative to said vase head whereby pivotal movement thereof effects retraction of said knob and thereby said valve plug from said valve seat.

11. In an aerating bottle or the like, a vase adapted to receive liquid, a head mounted thereon, a passageway through said head, a valve seat interposed in said passageway, a valve and operating assembly comprising a combined valve plug and gasket element of said resilient material having a plug at one end, a gasket ring at its other end and a cylindrical diaphragm connecting said ends together, a valve stem extending from said plug end of said element and through said cylindrical diaphragm, said vase head having a bore aligned with said valve seat to receive said element and a shoulder to abut the gasket ring thereof, means in said bore to seal said gasket ring to said head, a spring between said last means and said plug to normally seat said valve plug on said valve seat in a direction toward said vase whereby gas pressure in said vase will unseat the same, said spring being enclosed in said cylindrical diaphragm, and means cooperating with said valve stem to manually retract said valve plug from said valve seat.

12. In an aerating bottle or the like, a vase, a head mounted thereon, a passageway through said head, a valve seat interposed in said passageway, a combined valve plug and gasket element having a plug at one end, a gasket ring at its other end and a flexible tubular diaphragm connecting said ends together, a valve stem connected with said plug end of said element, a sleeve having a bore in which said valve stem is slidably mounted, said vase head having a bore aligned with said valve seat to receive said element, a shoulder to abut the gasket ring thereof and a part to threadedly receive said sleeve, a spring enclosed in said tubular diaphragm and adapted to normally seat said valve plug on said valve seat, a knob on said stem having a slidable and non-rotatable connection with said sleeve, and means to manually retract said knob, stem and valve plug.

13. An aerating bottle structure comprising a vase adapted to receive liquid, to vase head detachably mounted thereon, a passageway through said vase head including a valve seat interposed therein, a nozzle at the discharge end of said passageway, said valve seat facing in the direction of said nozzle, and a valve and valve operating assembly comprising an element having a valve plug and a flexible tubular diaphragm for sealing said valve plug relative to said vase head, a valve stem connected with said valve plug, a spring normally seating said valve plug on said valve seat whereby excess pressure in said vase may effect unseating of said valve plug with relation to said valve seat in opposition to said spring, said spring being located within said tubular diaphragm, and means to effect manual retraction of said valve plug from said valve seat.

LAWRENCE T. WARD.